US009448772B2

(12) United States Patent
Gulwani et al.

(10) Patent No.: US 9,448,772 B2
(45) Date of Patent: Sep. 20, 2016

(54) GENERATING PROGRAM FRAGMENTS USING KEYWORDS AND CONTEXT INFORMATION

(71) Applicant: Microsoft Corporation, Redmond, WA (US)

(72) Inventors: Sumit Gulwani, Redmond, WA (US); Jonathan Paul de Halleux, Seattle, WA (US); Nikolai Tillmann, Redmond, WA (US); Vu Minh Le, Davis, CA (US); Zhendong Su, San Ramon, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 13/931,625

(22) Filed: Jun. 28, 2013

(65) Prior Publication Data

US 2014/0282375 A1    Sep. 18, 2014

(51) Int. Cl.
*G06F 9/44*    (2006.01)
(52) U.S. Cl.
CPC ..................... *G06F 8/36* (2013.01)
(58) Field of Classification Search
None
See application file for complete search history.

(56) References Cited

U.S. PATENT DOCUMENTS

| | | | |
|---|---|---|---|
| 6,950,815 B2* | 9/2005 | Tijare et al. | |
| 7,367,043 B2* | 4/2008 | Dudkiewicz et al. | 725/138 |
| 8,645,825 B1* | 2/2014 | Cornea | G06F 17/276 |
| | | | 715/257 |
| 2004/0003335 A1* | 1/2004 | Gertz | H03M 13/47 |
| | | | 714/758 |
| 2005/0125766 A1 | 6/2005 | Hawley et al. | |
| 2005/0125767 A1 | 6/2005 | Hawley et al. | |
| 2005/0125773 A1 | 6/2005 | Hawley et al. | |
| 2006/0005169 A1 | 1/2006 | Berstis et al. | |
| 2006/0277525 A1* | 12/2006 | Najmabadi | G06N 5/04 |
| | | | 717/106 |
| 2007/0079361 A1* | 4/2007 | Hays et al. | 726/5 |
| 2008/0134142 A1* | 6/2008 | Nathan | G06F 8/73 |
| | | | 717/114 |
| 2008/0243819 A1 | 10/2008 | Sareen et al. | |

(Continued)

OTHER PUBLICATIONS

Hou, et al., "Towards a Better Code Completion System by API Grouping, Filtering, and Popularity-Based Ranking," retrieved at <<http://serl.clarkson.edu/site/wp-content/uploads/2011/08/BCC-RSSE10.pdf, Proceedings of the 2nd International Workshop on Recommendation Systems for Software Engineering, May 2010, 5 pages.

(Continued)

*Primary Examiner* — Adam Lee
(74) *Attorney, Agent, or Firm* — Alin Corie; Sandy Swain; Micky Minhas

(57) ABSTRACT

A program development framework (PDF) is described herein which allows a user to produce a program in piecemeal fashion by successively specifying program fragments. The PDF creates a new program fragment by receiving keyword information from the user that describes a new program fragment, and then identifies context information that pertains to a programmatic context in which the new program fragment appears within the overall program being created. The PDF then generates a set of candidate program fragments that satisfy the keyword information and the context information, and ranks those candidate program fragments based on ranking information. At least part of the ranking information may be based on statistical information that is produced by analyzing a corpus of previous programs produced by one or more users. The PDF then provides the ranked program fragments to the user using various user-friendly presentation strategies.

20 Claims, 12 Drawing Sheets

(56) References Cited

U.S. PATENT DOCUMENTS

| | | | |
|---|---|---|---|
| 2008/0270981 A1 | 10/2008 | Hutchison et al. | |
| 2008/0288249 A1* | 11/2008 | Grobauer et al. | 704/235 |
| 2009/0024606 A1* | 1/2009 | Schilit | G06F 17/2211 |
| 2009/0055813 A1* | 2/2009 | Haber | G06F 8/4441 |
| | | | 717/158 |
| 2009/0259987 A1 | 10/2009 | Bergman et al. | |
| 2010/0050151 A1 | 2/2010 | Balasubramanian | |
| 2010/0050154 A1 | 2/2010 | Balasubramanian | |
| 2010/0050160 A1* | 2/2010 | Balasubramanian | G06F 8/33 |
| | | | 717/126 |
| 2010/0242028 A1* | 9/2010 | Weigert | 717/131 |
| 2010/0262621 A1* | 10/2010 | Ross et al. | 707/780 |
| 2010/0325612 A1 | 12/2010 | Hutchison et al. | |
| 2011/0125667 A1 | 5/2011 | Faludi et al. | |
| 2011/0202887 A1 | 8/2011 | Mendez et al. | |
| 2011/0302162 A1* | 12/2011 | Xiao | G06F 17/30867 |
| | | | 707/724 |
| 2012/0174061 A1 | 7/2012 | McCollum et al. | |
| 2012/0246153 A1* | 9/2012 | Pehle | 707/723 |
| 2013/0007700 A1 | 1/2013 | Villar et al. | |
| 2013/0055138 A1* | 2/2013 | de Halleux | G06F 8/33 |
| | | | 715/773 |
| 2013/0074036 A1* | 3/2013 | Brandt et al. | 717/113 |
| 2013/0151519 A1* | 6/2013 | Akhin et al. | 707/737 |
| 2013/0263086 A1 | 10/2013 | Carter et al. | |
| 2014/0013299 A1* | 1/2014 | Bordeaux et al. | 717/106 |
| 2014/0173563 A1 | 6/2014 | Dias et al. | |
| 2014/0245258 A1* | 8/2014 | Frenkiel | G06F 8/51 |
| | | | 717/120 |

OTHER PUBLICATIONS

Little, Greg, "Programming with Keywords," retrieved at <<http://people.csail.mit.edu/glittle/Papers/MS%20Thesis.pdf>>, Master of Science Thesis, Massachusetts Institute of Technology, May 2007, 108 pages.

Little, et al., "Translating Keyword Commands into Executable Code," retrieved at <<http:/acm.org>>, Proceedings of the 19th Annual ACM Symposium on User Interface Software and Technology, Oct. 2006, pp. 135-145.

Han, et al., "Code Completion from Abbreviated Input," retrieved at <<http://dspace.mit.edu/openaccess-disseminate/1721.1/59377>>, Proceedings of the 2009 IEEE/ACM International Conference on Automated Software Engineering, Nov. 2009, 13 pages.

Little, et al., "Sloppy Programming", retrieved at <<http://groups.csail.mit.edu/uid/other-pubs/sloppy-programming.pdf>>, retrieved on Jun. 28, 2013, 19 pages.

"Basic Code Completion. Completing Names and Keywords," retrieved at <<http://www.jetbrains.com/ruby/webhelp/basic-code-completion-completing-names-and-keywords.html>>, retrieved on Feb. 13, 2013, 4 pages.

Gantenbein, Douglas, "Flash Fill Gives Excel a Smart Charge," retrieved at <<http://research.microsoft.com/en-us/news/features/flashfill-020613.aspx>>, Microsoft Corporation, Redmond, WA, Feb. 12, 2013, 3 pages.

Le, et al., "SmartSynth: Synthesizing Smartphone Automation Scripts from Natural Language," retrieved at <<http://csiflabs.cs.ucdavis.edu/~vmle/pdfs/mobisys13.pdf>>, The 11th International Conference on Mobile Systems, Applications and Services (MobiSys 2013), Jun. 25-28, 2013, 13 pages.

* cited by examiner

GENERATING PROGRAM FRAGMENTS USING KEYWORDS AND CONTEXT INFORMATION

This application claims the benefit of U.S. Provisional Application No. 61/788,100 (the '100 application), filed Mar. 15, 2013. The '100 application is incorporated by reference herein in its entirety.

BACKGROUND

The task of writing computer programs has traditionally been performed by experienced computer programmers. More recently, the industry has attempted to provide tools which simplify the creation of programs. These tools enable ordinary end users, who may lack advanced programming skills, to produce programs. Yet there is room for improvement in these efforts.

SUMMARY

A program development framework (PDF) is described herein which allows a user to produce a program in piecemeal fashion by successively specifying program fragments. The PDF creates a new program fragment by receiving keyword information from the user that describes the new program fragment, and by identifying context information that pertains to a context in which the new program fragment appears within the overall program being created. The PDF generates a set of candidate program fragments that satisfy the keyword information and the context information, and then ranks those candidate program fragments based on ranking information. The PDF then presents an output presentation to the user based on the set of ranked program fragments.

According to one illustrative aspect, the context information may include previously-defined program features which affect the new program fragment that the user wishes to generate. Such program features may include any of global variables, local variables, user-defined functions, etc.

According to another illustrative aspect, the ranking information may be based, at least in part, on statistical information produced by analyzing a corpus of programs, previously created by one or more users. The statistical information may include frequency information, interrelation information, selection information, etc., to be described below.

According to another illustrative aspect, the PDF can provide an output presentation that involves a level of interaction with the user which, in turn, is based on a degree of confidence associated with the ranked program fragments. For example, the PDF can immediately display the code associated with a top-ranked program fragment if that fragment has a high level of confidence associated with it. Otherwise, the PDF can display a list of the ranked program fragments, and ask the user to choose a desired fragment.

According to another illustrative aspect, the PDF can inform the user of any keyword(s) that did not play a role in generating a ranked program fragment (if any).

The above approach can be manifested in various types of systems, components, methods, computer readable storage media, data structures, articles of manufacture, graphical user interface presentations, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative program development framework (PDF) for allowing a user to produce a program by successively selecting program fragments. Section B describes an illustrative method which explains the operation of the functionality of Section A. Section C describes illustrative computing functionality that can be used to implement any aspect of the features described in Sections A and B.

Figure 12:
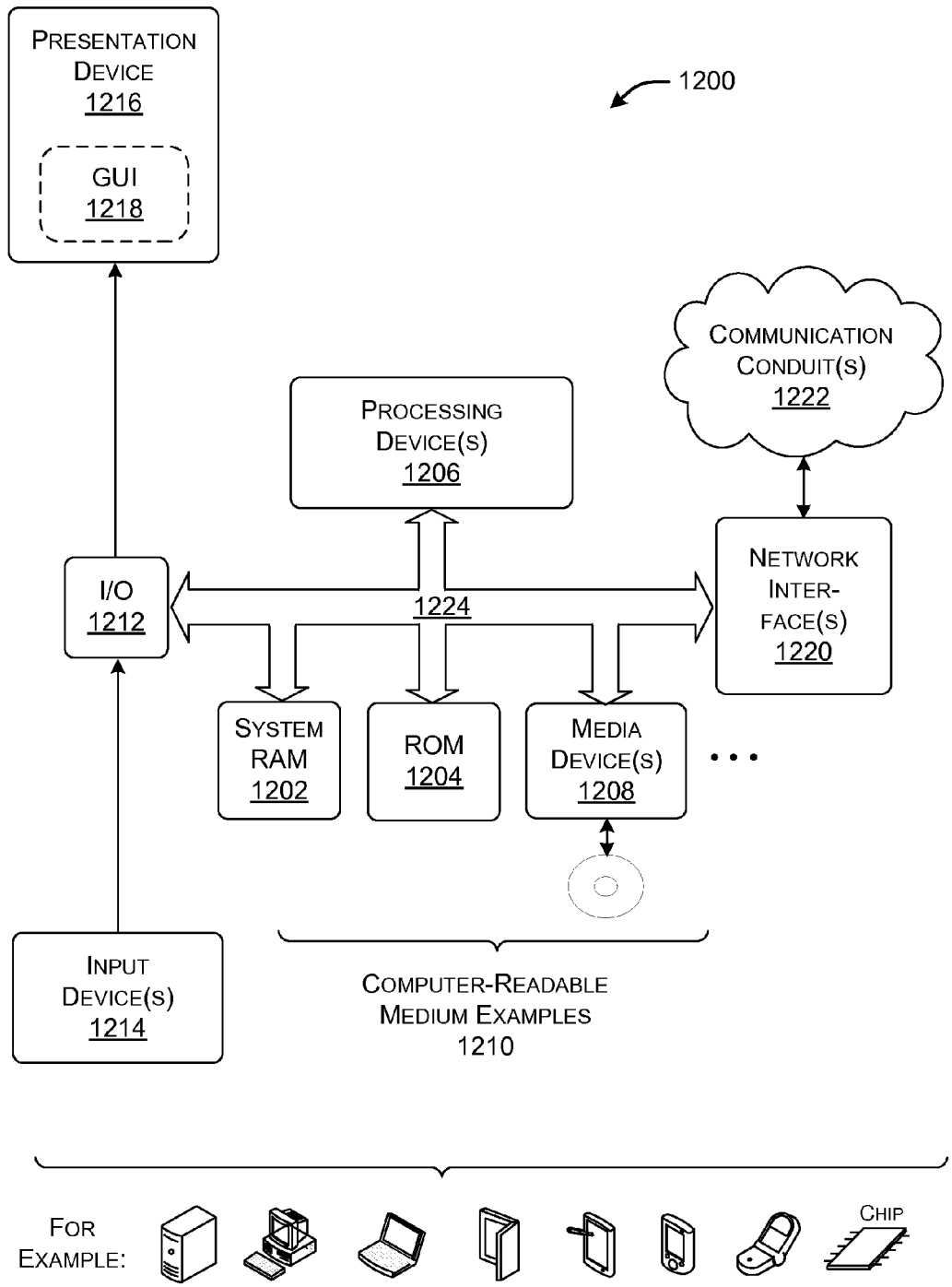
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by computer equipment running software and/or firmware, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by computer equipment running software and/or firmware, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, computer equipment running software and/or firmware, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, computer equipment running software and/or firmware, hardware (e.g., chip-implemented logic functionality), etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
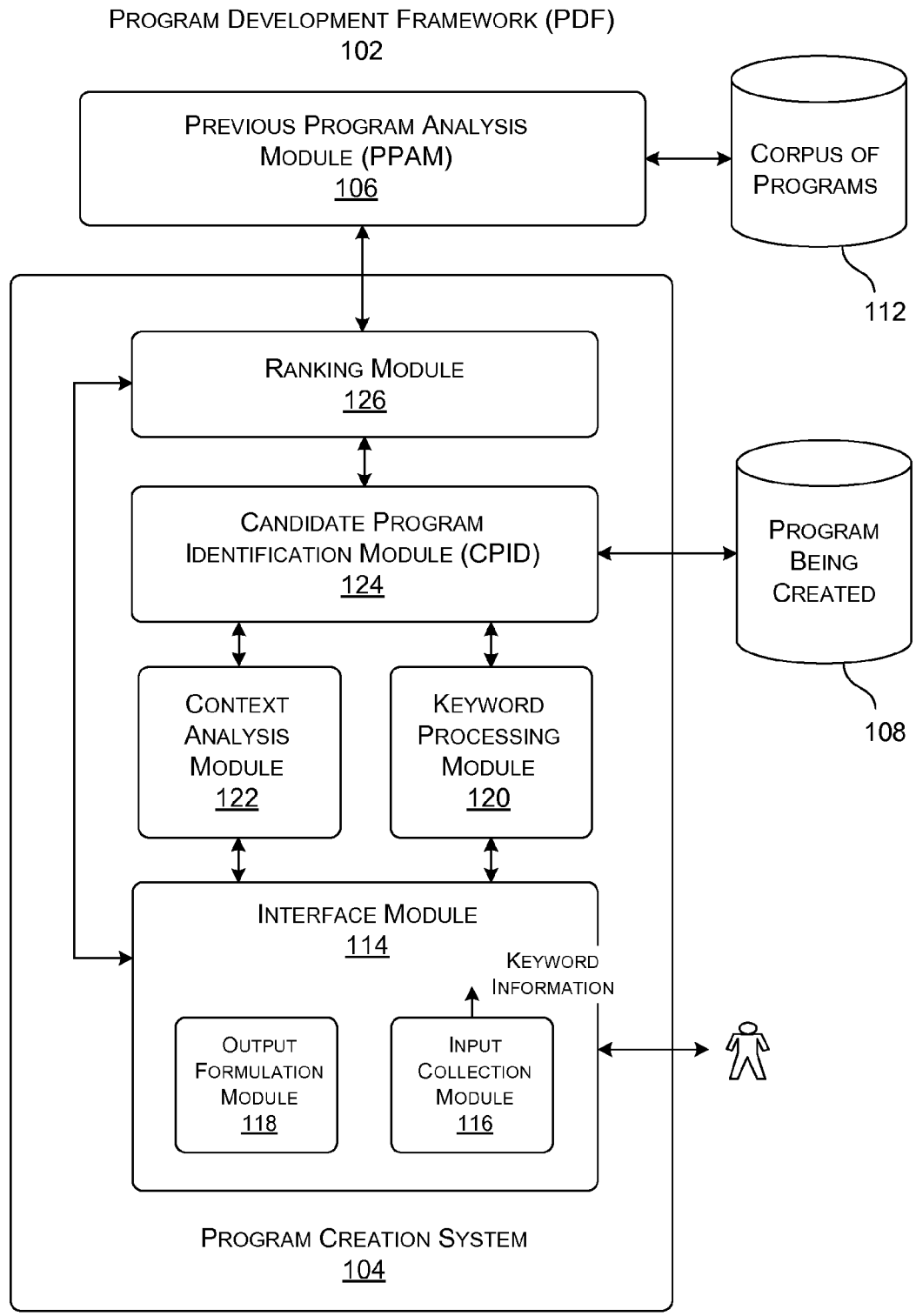
FIG. 1 shows an illustrative program development framework (PDF) that allows a user to produce a program by selecting program fragments in piecemeal fashion.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Program Development Framework A.1. Overview FIG. 1 shows an illustrative program development framework (PDF) 102 that allows a user to create a program in piecemeal fashion, e.g., by selecting one program fragment at a time. A program corresponds to any instructions, expressed in any computer language (or combination of computer languages), that may be executed by a computing device to perform any function in any application domain. A program fragment corresponds to a part of a program that performs any task.

Figure 2:
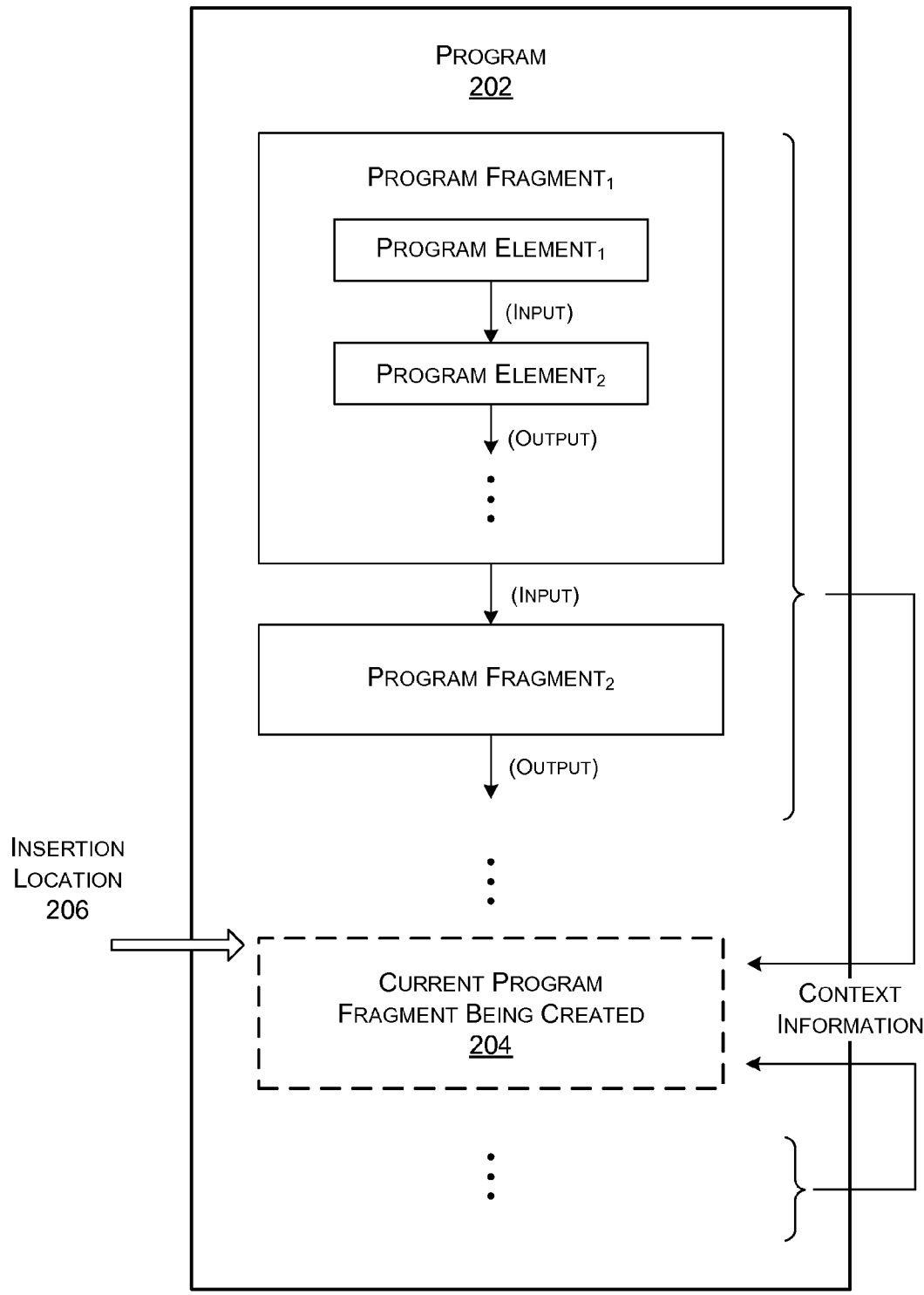
FIG. 2 shows an illustrative program produced by the PDF of FIG. 1.

Advancing momentarily to FIG. 2, this figure shows an illustrative program 202 that may be created by the PDF 102. The program 202 includes one or more program fragments (e.g., program fragment$_1$, program fragment$_2$, etc.). Each program fragment, in turn, is made up of one or more program elements (e.g., program element$_1$, program element$_2$, etc. provided by program fragment$_1$). A program element may correspond to any element of code. Without limitation, in one case, a program element may correspond to an application programming interface (API). A program element may receive input from one or more other "upstream" program element(s), and supply output to one or more "downstream" program element(s). For example, program element$_2$ in program fragment$_1$ receives input information from program element$_1$, and supplies output information to program element$_3$ (not shown).

At any given time, a user may seek to generate a new program fragment 204 to add to the program 202. An insertion location 206 defines a location within the program 202 at which the user wishes to insert the new program fragment 204. In FIG. 2, the user seeks to add the new program fragment 204 at the end of a series of instructions that define the program 202 in its current state. But in other cases, the user may seek to add the new program fragment 204 at another location within the program 202, not necessarily at the "end" of the program 202.

In one implementation, the user may create the program 202 on any type of computing device. The user may then run the program 202 on the same computing device, or a different computing device. In one case, for instance, the user may create and/or execute the program 202 on a portable handheld computing device, such as a smartphone, a personal digital assistant, a media consumption device (such as an electronic book reader device, a music-playing device, etc.), a handheld game-playing device, a tablet computing device, and so on. In another case, the user may create and/or execute the program 202 on a stationary computing device, such as a personal computer, a game console device, a set-top box device, and so on.

Returning to FIG. 1, the PDF 102 can include a plurality of modules which perform different respective functions. From a high level perspective, the PDF 102 includes a program creation system 104 and a previous program analysis module (PPAM) 106. The program creation system 104 produces a program in an interactive manner, in response to input from a user. A data store 108 may store the program that the user creates using the program creation system 104.

The PPAM 106 analyzes a corpus of programs that have been previously created by a population of users. That is, the users may create these programs using the program creation system 104, or in some other manner (including a manual manner of writing the programs, in element-by-element fashion). A data store 112 stores the programs. Each program may have the structure described in FIG. 2. The PPAM 106 produces statistical information as a result of its analysis. For example, the PPAM 106 can produce frequency information that reveals the frequencies of respective program elements (e.g., APIs) within the corpus of programs. In addition, or alternatively, PPAM 106 can produce interrelation information that reveals the prevalence of identified relationships among program elements within the corpus of programs. For example, one piece of the interrelation information may describe the prevalence of a data flow between an output of a particular program element and an input to another program element. The PPAM 106 can also produce selection information that identifies the frequencies at which users select program elements after entering identified keyword information. The PPAM 106 can produce yet further information based on its analysis of the programs.

Now referring to the program creation system 104 in greater detail, an interface module 114 provides a mechanism by which a user may interact with the program creation system 104. The interface module 114 includes an input collection module 116 and an output formulation module 118. The input collection module 116 receives input from the user, while the output formulation module 118 provides output information to the user. The user may provide the input information using any input device(s), such as a keypad input device, a touchscreen input mechanism, and so on. The user may consume the output information using any output device, such as a display screen of any type, a projector device, and so on.

More specifically, the input collection module 116 can receive keyword information from a user that describes a new program fragment that the user wishes to generate at a particular time in the process of creating a program. The keyword information is made up of one or more keywords. An individual keyword, in turn, may correspond to a single string, or may correspond to a key phrase that includes two or more strings. More generally, the keyword information describes the program fragment in a high-level and informal manner, meaning that it need not conform to the formal syntax of any programming language. By virtue of this manner of interaction, the program creation system 104 provides a mechanism by which any user can create programs, even users without formal programming skills.

For example, assume that the user is writing a program that will run on a handheld device, such as a smartphone. Further assume that, at a particular juncture in the process of creating this program, the user wishes to describe a program fragment that performs the task of taking a picture using the handheld device, and then drawing a text message on the picture in a particular color, such as pink. Without limitation, the user may describe this operation using the keywords "Take a photo draw text message pink." Further, the user can enter these keywords in any arbitrary order, without regard to the syntax of the computer code that will ultimately be produced by the program creation system 104.

More specifically, in some cases, the user may enter one or more keywords that describe a particular action, as in "Take a photo." In other cases, the user may enter one or more keywords that describe a particular argument value, as in "pink." In other cases, the user may enter one or more keywords that describe a predicate, such as by entering the keyword "5" to indicate that a certain operation is to be repeated five times. In other cases, the user may enter one or more keywords that describe a particular event, as in the receipt of a message. These are merely examples; no limitation is placed on the programmatic features that a user may attempt to target using keywords.

An optional keyword processing module 120 may retrieve additional information regarding the keyword information, to yield expanded keyword information. The keyword processing module 120 can retrieve the additional information from any information source, referred to herein as a dictionary. In one implementation, the dictionary may store a list of possible program features (such as APIs, event names, argument names, etc.). Further, the dictionary may associate each program feature with a set of keywords that a user is likely to use in describing the program feature. In operation, the keyword processing module 120 can feed a keyword as an input query to the dictionary. If there is a match between the keyword and an entry in the dictionary, the keyword processing module 120 can retrieve any supplemental information regarding the keyword that is stored in the dictionary.

For example, the keyword processing module 120 can map the key phrase "draw text" or "display text" to an entry in the dictionary that is associated with a DrawText API. That API draws text on a display device. The keyword processing module 120 can then retrieve information regarding the DrawText API from the dictionary, such as the identity (e.g., the ID) of the API and its signature. The signature may identify the type of input information (if any) that is fed to the API, as well as the type of output information (if any) that is output by the API.

In some cases, the keyword processing module 120 can map a keyword to two or more possible interpretations of the keyword. This result may occur when there is ambiguity in the interpretation of a keyword. In other cases, the keyword processing module 120 may fail to find a matching entry in the dictionary for a specified keyword. For example, the user may enter a keyword that is intended to identify a user-defined function, having an arbitrary name. The dictionary will have no entry for this keyword. In another case, the user may enter a keyword, such as "pink." If no API accepts an argument value corresponding to the string "pink," then the dictionary may lack an entry for this keyword.

A context analysis module 122 identifies the context in which the user wishes to add the current program fragment to a program that is being created. For instance, in FIG. 2, the user wishes to add a new program fragment 204 to the program 202 at the insertion location 206. The context analysis module 122 identifies all previously-defined features in the program 202 that may affect the new program fragment 204. In other words, the context analysis module 122 identifies all features in the program 202 that can possibly play a role in the interpretation of the user's intent in entering the keyword information. The context analysis module 122 can identify those features in any manner, such as by using static analysis on the program 202.

In one case, the context analysis module 122 identifies one or more local variables and/or one or more global variables within the program 202 that may impact the new program fragment 204. These variables are live in the sense that the new program fragment 204 could conceivably perform some operation that involves the use of these variables. The context analysis module 122 can also identify functions that have been previously defined within the program 202 that may impact (e.g., which can be used in) the new program fragment 204. Any such contextual items correspond to "context information" according to the terminology used herein.

A candidate program identification module (CPID) 124 generates a set of zero, one, or more candidate program fragments based on both the keyword information and the context information. The keyword information may correspond to the keyword information as originally received by the input collection module 116 or the expanded keyword information produced by the keyword processing module 120. As set forth in Section A.2 (below), the CPID 124 can perform this task in different ways.

In some instances, the CPID 124 can use the context information to fill in omissions or "holes" in the specified keyword information. For example, assume that that the CPID 124 maps the keyword information into a program fragment that includes one or more APIs. But suppose that this candidate program fragment operates by receiving two input parameters, whereas the keyword information only seems to supply one of these parameters. The CPID 124 can address this issue by examining the context information to determine if it specifies a live variable which matches the missing parameter. If so, the CPID can insert the live variable into the program fragment.

In another case, the context information may provide assistance in interpreting a keyword. For example, assume that a user has previously defined a function and given it the arbitrary name "DeletePic." The user may subsequently input keyword information that targets the user function by including the string "DeletePic," or a similar string (which can be detected using any similarity metric, such as an editing distance metric). The CPID 124 can compare the keyword information to the context information to determine if the user is attempting to identify a previously defined user function.

A ranking module 126 ranks the program fragments in the set of candidate programs, to produce a set one zero, one, or more ranked program fragments. The ranking module 126 can perform this task by assigning a ranking score to each candidate program fragment, based on ranking information. The ranking information may be generated, at least in part, based on statistical information provided by the PPAM 106. As noted above, the PPAM generates the statistical information by analyzing the corpus of previously-created programs in the data store 112. Section A.3 describes the operation of the ranking module 126 in greater detail.

The output formulation module 118 informs the user of the results of the ranking module 126 using one or more presentation strategies. Section A.4 describes the operation of the output formation module 118 in greater detail. By way of preview, in one case, the output formulation module 118 can present a list of ranked program fragments to the user. The user may review the list and then pick a suitable fragment from the list; a suitable fragment is one that appears to perform the desired operation (meaning the operation that the user was attempting to describe by entering the keyword information). In response, the program creation system 104 can add the code associated with the selected fragment to the program being created. Alternatively, the user may decide that none of the ranked program fragments performs the desired operation. The user may address this situation by attempting to reformulate the keyword information.

According to another feature, the output formulation module 118 can provide, for each ranked program fragment, an indication of any keyword that did not contribute to the generation of that fragment. The user may use this information to help determine whether a fragment adequately performs the desired operation. The user may also use this information to help him or her reformulate the keyword information. For example, the output formulation module 118 can inform the user that the string "pink" did not play a role in generating a particular program fragment. The user may then opt to reformulate the keyword information by using the word "red" instead of "pink."

According to another feature, the output formulation module 118 can provide different types of output presentations that impose different levels of interactivity with the user. For example, the output formulation module 118 can compare each ranked program fragment with an environment-specific threshold value. If none of the ranked program fragments exceeds this threshold value, then the output formulation module 118 can display the above-described type of list. The user can then select a desired program fragment in the list in the manner described above, or decide to reformulate his or her keyword information. Alternatively, assume that the top-ranked program fragment equals or exceeds the threshold value, indicating that there is a high level of confidence associated with the top-ranked program fragment. In response, the output formulation module 118 can immediately add the code associated with the top-ranked program fragment to the program being created, and then show the user the result of this operation. This mode of operation omits the step of asking the user to select a desired program fragment from a list of ranked program fragments.

Figure 3:
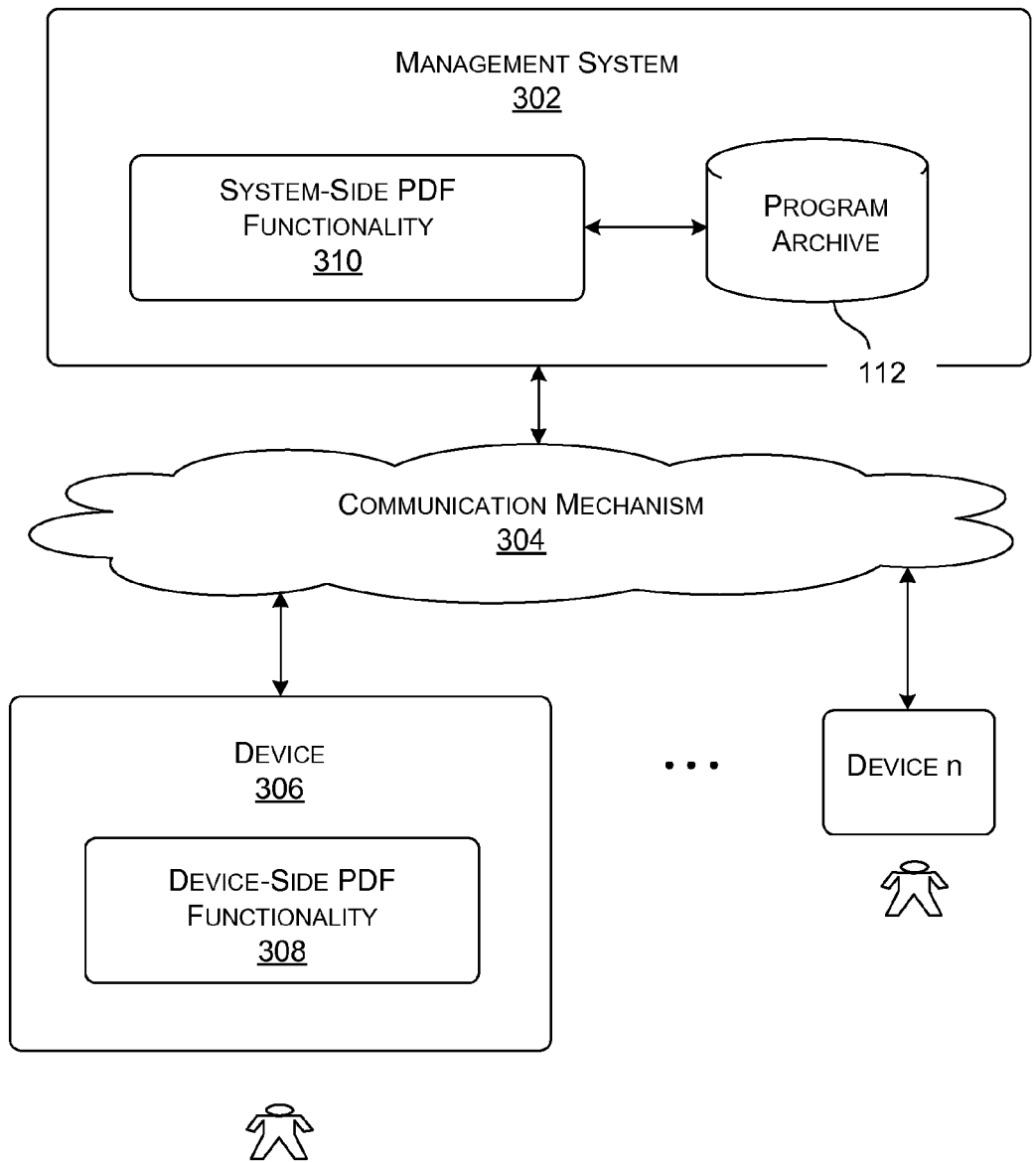
FIG. 3 shows one illustrative implementation of the PDF of FIG. 1.

Advancing to FIG. 3, this figure shows one implementation of the PDF 102 of FIG. 1. In this case, a plurality of user devices may optionally interact with a management system 302 via a communication mechanism 304 (such as the Internet). One such user device is a representative user device 306.

The functionality associated with the PDF 102 can be distributed between each user device and the management system 302 in any manner. FIG. 3 makes this point by showing that the user device 306 includes any device-side PDF functionality 308, while the management system 302 includes any system-side PDF functionality 310. For example, in one case, the user device 306 performs, in local fashion, all functions attributed above to the program creation system 104 of FIG. 1. The management system 302 can perform all functions associated with the PPAM 106 of FIG. 1. The management system 302 may also provide the data store 112 which houses the corpus of programs. In other implementations, the user device 306 can delegate its most processor-intensive analysis functions to the management system 302, such as the fragment-generation processing performed by the CPID 124.

A.2. Illustrative Candidate Program Identification Module (CPID)

Figure 4:
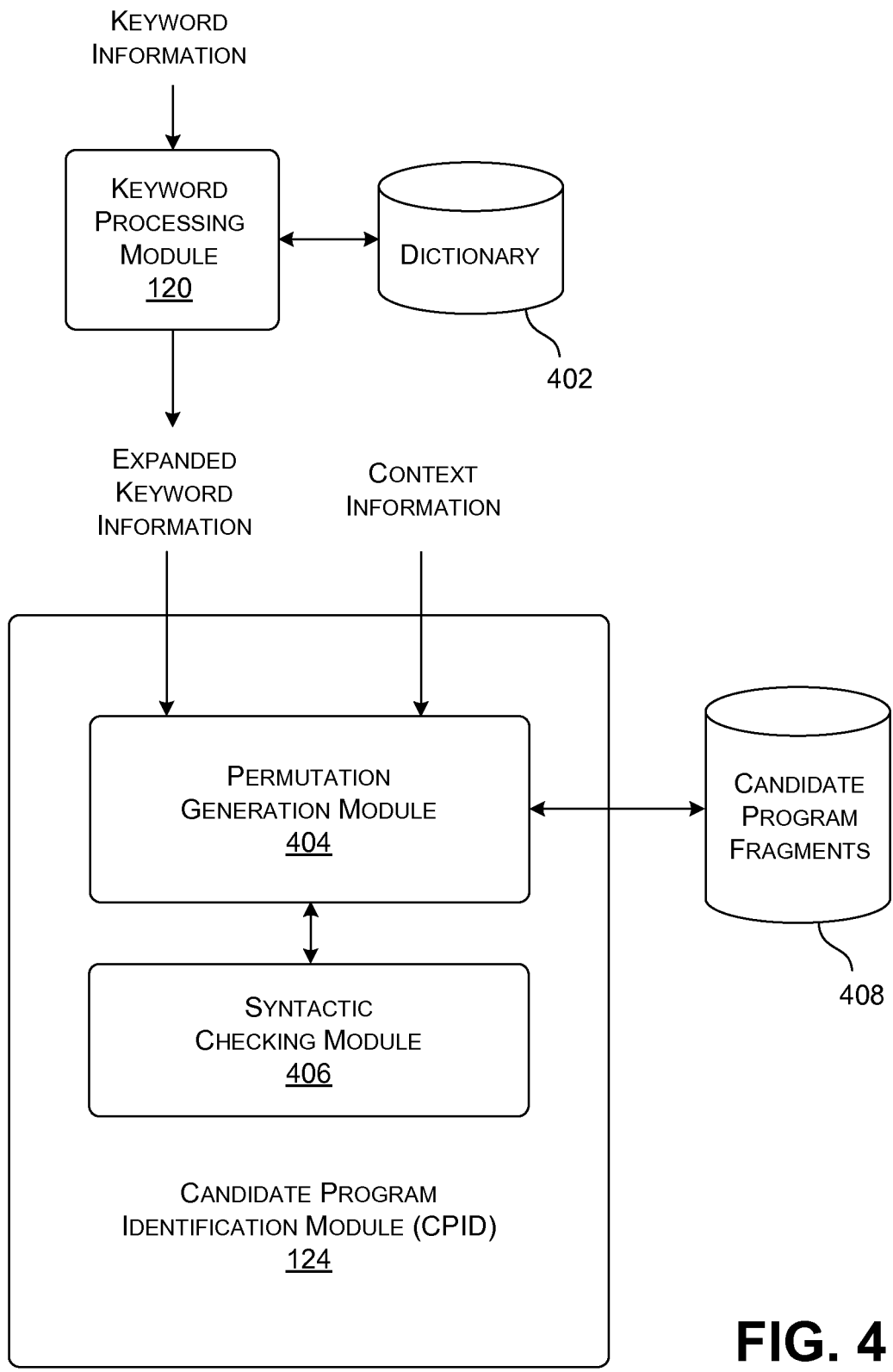
FIG. 4 shows one illustrative implementation of a candidate program identification module (CPID), which is a component of the PDF of FIG. 1.

FIG. 4 shows one implementation of the candidate program identification module (CPID) 124 introduced in Section A.1. To summarize, the user may supply keyword information that describes a desired program fragment. The optional keyword processing module 120 can then consult a dictionary stored in a data store 402 based on the original keyword information, to produce expanded keyword information. Further, the context analysis module 122 (not shown in FIG. 4) may identify context information that may potentially affect the program fragment being created. As noted above, the context information may include global variables, local variables, user-defined functions, and so on. The CPID 124 then generates a set of zero, one, or more candidate program fragments based on the keyword information and the context information.

The CPID 124 can use different techniques for generating the set of candidate program fragments. In one approach, the CPID 124 can use a permutation generation module 404 to enumerate all the possible ways of interpreting the keyword information and the context information, and all the possible ways of connecting the program elements associated with the interpreted keyword information and context information. A syntactic checking module 406 can identify whether each candidate program fragment produced by the permutation generation module 404 is a valid program fragment, based on rules associated with a particular programming language. The CPID 124 can store syntactically valid candidate program fragments in a data store 408.

In one implementation, the permutation generation module 404 generates the set of candidate program fragments by enumerating valid constructions within a context free grammar G. The context free grammar can be formally expressed by the tuple $\{S, NT, T, R\}$. The symbol S refers to a start symbol associated with the context free grammar G. NT describes a plurality of non-terminal nodes, while T describes a plurality of terminal nodes. R corresponds to a set of rules that define expansions, each having the form nt→γ, where nt corresponds to any non-terminal node and γ corresponds to any combination of non-terminal nodes and terminal nodes. A "grammatical" program fragment corresponds to a fragment that conforms to the context free grammar G. A language L is defined by the set of all grammatical program fragments that can be expressed using G.

Additional environment-specific rules W (which are not formally part of the grammar G) are used to expand (or instantiate) terminal nodes into particular respective program elements. The program elements constitute the actual parts of the program fragments. In the present context, there are three categories of terminal nodes. Some terminal nodes can be instantiated using the keyword information, as optionally expanded by the keyword processing module 120. Other terminal nodes can be instantiated using the context information. Other terminal nodes can be instantiated using system-supplied programmatic features which are not specified by the user. In other words, these system-generated program features constitute the "glue" code which joins the user-specified program features together, such as temporary variables, various syntactic constructs within a computer language, etc.

Figure 5:
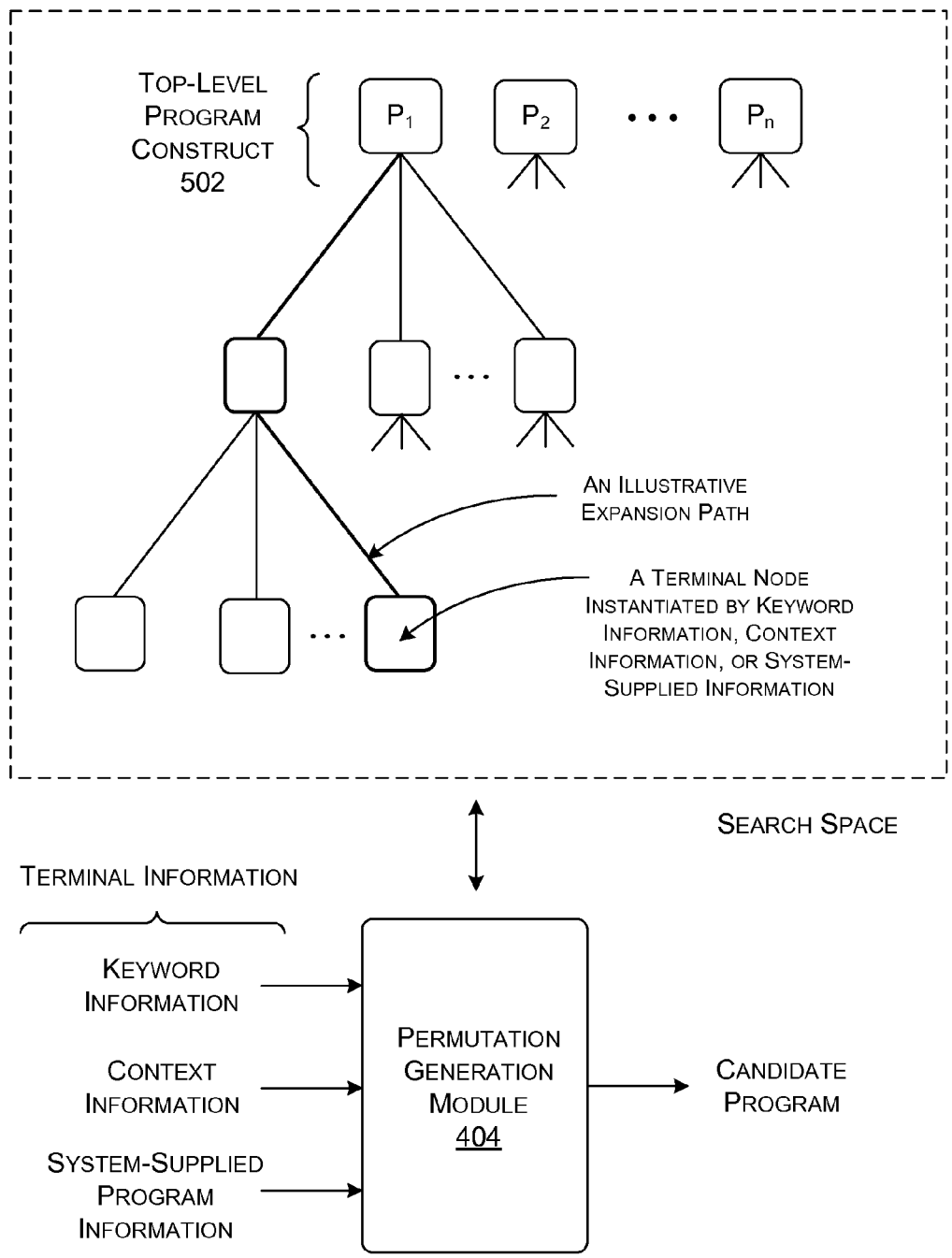
FIG. 5 shows one technique that the CPID (of FIG. 4) may use to generate a set of candidate program fragments.

FIG. 5 depicts one way of generating program fragments based on the principles described above. Here, to simplify and expedite processing, the permutation generation module 404 expresses a master set of all valid program fragments as a top-level program construct 502. The top-level program construct 502 can include a plurality of abstractly-specified program parts, $P_1, P_2, \ldots P_n$. For example, the top-level program construct 502 may describe the abstract scenario in which a program P, having some input parameters I, initiates some processing when triggered by some event E. When the event occurs, the program generates some values. A conversion operation F optionally performs type conversion of these values. A condition C is then evaluated; if it is satisfied, the program executes a list of statements S. The abstractly specified parts {I, E, F, C, S} define the top-level program construct 502. Other implementations can express the set of possible program fragments using other top-level constructs.

The permutation generation module 404 may operate by successively expanding the parts of the top-level program construct 502. That is, the permutation generation module 404 can expand a non-terminal node using any rule associated with it in R. The permutation generation module 404 can expand (or instantiate) a terminal node in any manner described above, based an appropriate rule in the rule set W. For example, at some junctures, the permutation generation module 404 may attempt to expand a terminal node by drawing on a keyword specified in the keyword information. At other junctures, the permutation generation module 404 may attempt to expand a terminal node by drawing on a context item obtained from the context information. At other junctures, the permutation generation module 404 may seek to expand a terminal node by supplying a system-generated program feature, such as a temporary variable, an input variable, and so on. These types of expansions yield program tokens (i.e., program elements), which, in turn, define the actual parts of the program fragment.

For example, the permutation generation module 404 may expand the abstractly specified part S into an Action terminal node that pertains to an action, an AList terminal node which pertains to a list of input arguments received by the action, and an RList terminal node that pertains to a list of output information generated by the action. As per a defined instantiation rule in W, the permutation generation module 404 attempts to expand (or instantiate) the Action node by drawing on keyword information. Assume that the user has supplied the key phrase "transmit message," and that the keyword processing module 120 has mapped this key phrase into a SendMessage API, which it identifies as an action-type API. More specifically, this API sends a message (identified by a first input parameter) to a destination (identified by a second input parameter). The permutation generation module 404 may instantiate the Action node with the SendMessage API, thereby defining one part of the program fragment being created.

Next, the permutation generation module 404 expands the AList node into two arguments and expands the RList node into an empty string (because the type signature of SendMessage specifies that it accepts two input arguments and supplies no output information). To further expand the AList node, the permutation generation module 404 examines the keyword information and/or the context information. More specifically, assume that the permutation generation module 404 finds a string in the keyword information that may be used to instantiate the second parameter of the API, corresponding to an Email address specified by the user. But assume that the permutation generation module 404 cannot find any string in the keyword information that likely corresponds to message content. In response, the permutation generation module 404 can examine the context information to determine if it supplies an item of an appropriate type that can be used to fill the missing "hole" in the keyword information.

The permutation generation module 404 generates a complete program fragment by expanding each of the abstractly-specified program parts in the above-described manner. Overall, the permutation generation module 404 generates a complete set of program parts by exploring all the different ways that the top-level program construct 502 can be expanded using the viable rules in R and W. For example, in some cases, the permutation generation module 404 may find that there are plural viable instances of available program elements that can be used to expand a particular terminal node. The permutation generation module 404 successively picks different node-expansion options upon each exploration through the search space, to provide different respective expansion permutations. The permutation generation module 404 can also use various strategies to expedite this analysis, such as by truncating a search through a branch of the search space if it fails to yield suitable program fragments, as determined based on any environment-specific cost metric(s).

In another implementation, the CPID 124 can maintain a set of templates. Each template may specify a program fragment. But each template may optionally be generalized in that it includes one or more slots for receiving later-supplied information. In a first phase, the CPID 124 can use the keyword information as a search query to find a set of templates which match the keyword information, within some degree of matching confidence (e.g., using a cosine similarity measure or the like). In doing so, the templates can be viewed as documents that contain a collection of words. In a second phase, the CPID 124 can fill in the slots in the identified templates with the keyword information and/or context information. For example, the CPID 124 fills in a slot that expects a string variable with a string value obtained from either the keyword information or the context information. The CPID produces a plurality of candidate program fragments for a given instance of keyword information because: (a) there may be a plurality of templates that match the keyword information; and (b) for each template, there may be a plurality of viable ways in which the keyword information and the context information can be used to fill in the slots in the template.

The above implementations of the CPID 124 are cited by way of example, not limitation. Still other implementations of the CPID 124 are possible.

A.3. Illustrative Ranking Module

Figure 6:
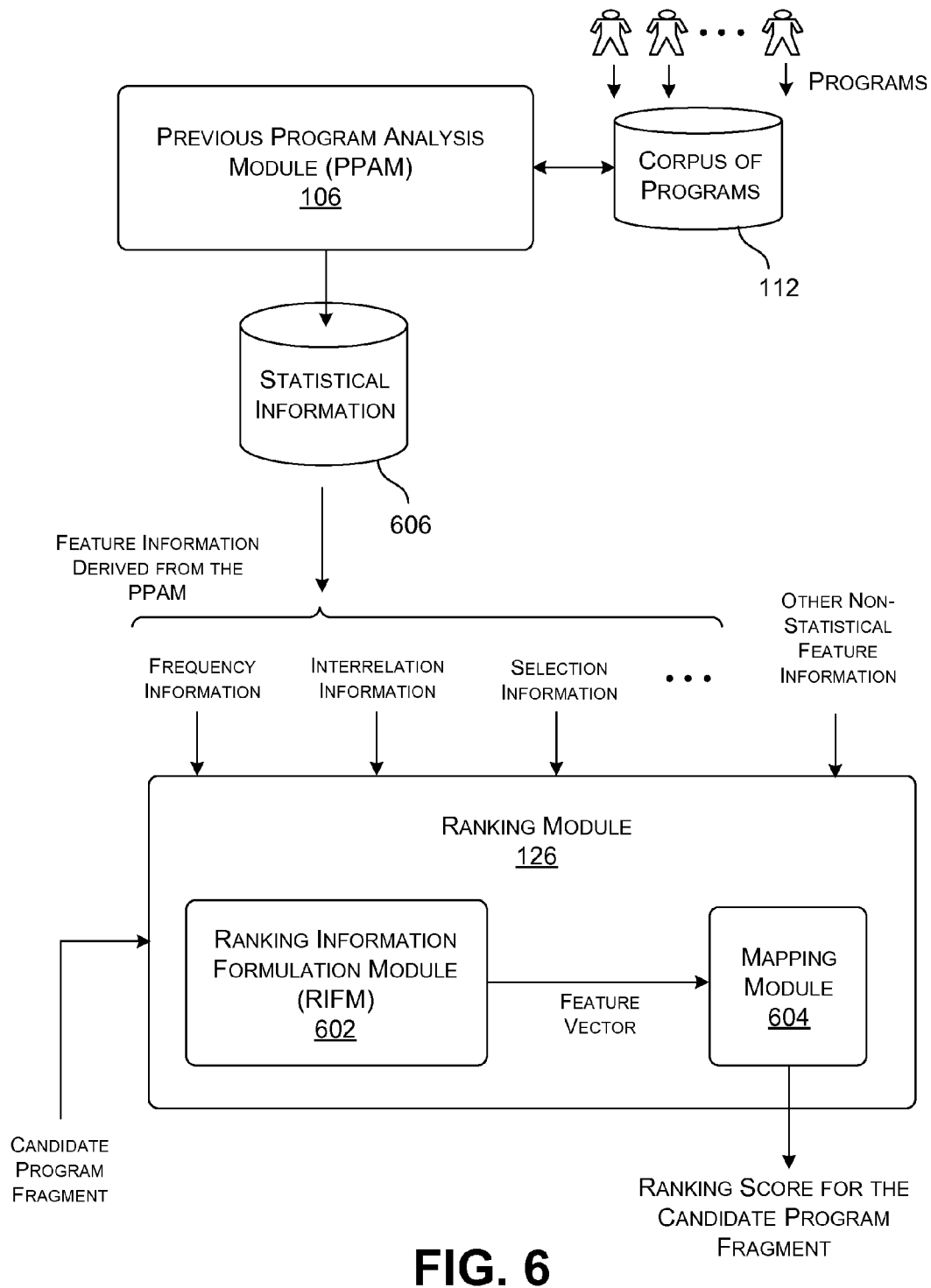
FIG. 6 shows one illustrative implementation of a ranking module, which is a component of the PDF of FIG. 1.

FIG. 6 shows one implementation of the ranking module 126. The ranking module 126 includes a ranking information formulation module (RIFM) 602 and a mapping module 604. The RIFM 602 formulates ranking information associated with a candidate program fragment under consideration. The mapping module 604 maps the ranking information to a ranking score.

The RIFM 602 may generate the ranking information, in part, based on statistical information obtained from the PPAM 106. As described above, the PPAM 106 generates the statistical information by analyzing the corpus of programs stored in the data store 112. For example, the PPAM 106 can generate frequency information, interrelation information, selection information, etc. The frequency information reflects the frequencies at which program elements appear within the corpus of programs. The interrelation information describes the prevalence of identified relations among program elements within the corpus of programs.

The selection information identifies the frequencies at which users have selected the program elements within search results provided by some ranking algorithm, after providing identified keyword information. For example, assume that the user is offered a set of ranked program fragments after entering the keyword information X, corresponding to one or more keywords. Then assume that the user selects one of the program fragments. The selected program fragment contains one or more program elements. The user is thereby considered to have selected each of the program elements within the program fragment in response to entering the keyword information X.

In the above explanation, the term program element can correspond to program features having any level of granularity. As depicted in FIG. 2, for instance, the program elements may correspond to relatively small parts of the program fragments, such as individual APIs within the program fragments. In other cases, the program elements may correspond to respective groupings of smaller program fragments. For example, in addition to identifying the frequencies at which individual APIs appear within the corpus of programs, the PPAM 106 can identify the frequencies at which individual program fragments appear within the corpus of programs. And in addition to identifying relationships among individual APIs, the PPAM can identify the relationships of entire program fragments. Further, in some cases, the PPAM 106 can use fuzzy matching to identify the prevalence of similar program elements in the corpus of programs, although not necessarily identical program elements.

In one case the PPAM 106 can generate the statistical information in an off-line fashion, and then store the statistical information in a data store 606. For example, the PPAM 106 can update the statistical information on a periodic basis, such as every day, or week, or month, etc.

In another case, the PPAM 106 can generate the statistical information on a dynamic basis, when it is requested. For example, when considering a particular candidate program fragment, the RIFM 602 can identify the characteristics of this fragment. The RIFM 602 can then ask the PPAM 106 to provide statistical information that has a bearing on the identified characteristics of the candidate program fragment. The PPAM 106 responds by examining the corpus of programs in a dynamic manner to compile and forward the requested statistical information.

The RIFM 602 can generate ranking information based on the frequency information in the following manner. The RIFM 602 can first identify the constituent program elements in a candidate program fragment under consideration. Assume, in one merely illustrative case, that the candidate program fragment includes four APIs. The RIFM 602 can then consult the statistical information to identify the frequencies at which these four APIs occurs within the corpus of programs. The RIFM 602 can convey this ranking information as four separate frequency measures or as one composite frequency measure, e.g., corresponding to the average of the four separate frequency measures).

The RIFM 602 can generate ranking information based on the interrelation information in the following manner. Again assume that the candidate program fragment includes four APIs. Each API may accept input information from an "upstream" API, and supply output information to a "downstream" API. The RIFM 602 first identifies these flow relationships. The RIFM 602 then consults the statistical information to identify how common each such relationship is within the corpus of programs. Again, the RIFM 602 can convey this ranking information as separate interrelation measures or as one composite interrelation measure.

The RIFM 602 can generate ranking information that describes any other relationship among program elements. For example, the RIFM 602 can form an interrelation measure which reflects the frequency at which two program elements appear in the same program fragment. In addition, the RIFM 602 can form an interrelation measure which reflects the frequency at which a specified program element precedes another program element (without necessarily directly supplying input information to that other program element). These examples are cited by way illustration, not limitation.

The RIFM 602 can generate ranking information based on selection information in a similar manner to that specified above. For example, assume that the user has entered keyword information Y, corresponding to one or more keywords. And again assume that the candidate program fragment under consideration has four APIs. The RIFM 602 can identify selection measures for each of these APIs for keyword information Y. For instance, the selection measure for the first API identifies the number of times that users have selected a program fragment that contains the API after submitting the keyword information Y. Or the RIFM 602 can generate a single selection measure which reflects some combination of the individual measures.

The RIFM 602 can also generate ranking information that reflects different groupings of programs created by users. For example, the PPAM 106 can produce statistical information based on programs created by the particular user under consideration (meaning the user who is now interacting with the program creation system 104). In addition, or alternatively, the PPAM 106 can produce statistical information based on programs created by a subset of users (if any) who have one or more characteristics in common with the particular user. In addition, or alternatively, the PPAM 106 can produce statistical information based on programs created by all users, and so on. In operation, the RIFM 602 can identify the particular user (e.g., based on log-in information supplied by the user or the like), and then retrieve statistical information that is pertinent to the user from the PPAM 106.

In addition, the RIFM 602 can generate other ranking information that is not necessarily derived from statistical information supplied by the PPAM 106. This information may be regarded as non-statistical ranking information to distinguish it from the above-described ranking information that is derived from the statistical information. For example, the ranking information can include a measure which reflects the complexity of a candidate program fragment under consideration. Complexity can be assessed in different ways, such as the number of program elements in the program fragment, and/or the complexity of individual program features within the program fragment. In one environment, simple program fragments are generally preferred over more complex program fragments.

In another case, the RIFM 602 can form ranking information which identifies whether the candidate program fragment includes variables or other items that do not appear to be "consumed" by any program element, and thus appear to serve no purpose. This factor, if present, detracts from the desirability of the candidate program fragment.

The RIFM 602 can collect yet other kinds of statistical and non-statistical ranking information. The above examples of ranking information are cited by way of illustration, not limitation.

In one case, the RIFM 602 can formulate the above-described ranking information as a feature vector. The feature vector includes features that correspond to different aspects of the ranking information described above. For example, the feature vector can include features for storing one or more frequency values, one or more interrelation values, one or more selection values, one or more non-statistical ranking measures, and so on. The feature vector can also provide group-specific features, such as by providing one or more frequency values that describe frequency information associated with the particular user under consideration, and one or more frequency values that describe frequency information associated with all users. The mapping module 604 then operates on the feature vector to generate a ranking score. In one case, for example, the mapping module 604 forms the ranking score based on a weighted combination of the feature values. A model defines the weights applied to the respective features. A training system (not shown) can generate the weights of the model by operating on a training set of programs, using any machine learning technology. More specifically, the mapping module 604 can be implemented using any technology, such as, but not limited to an ensemble of decision trees, a neural network, a support vector machine, and so on.

A.4. Illustrative Interface Module

Figure 7:
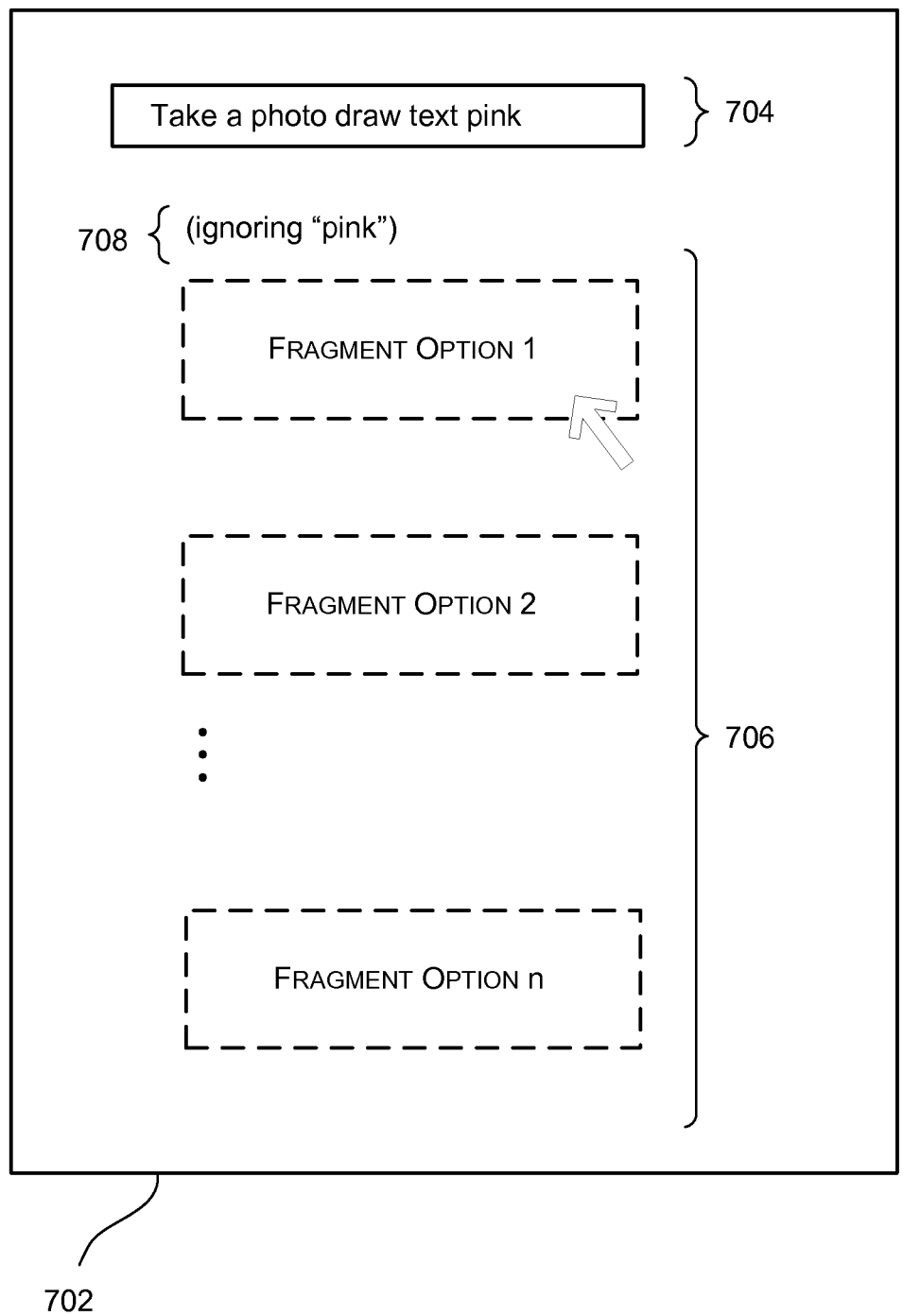
FIG. 7 shows a user interface presentation that may be produced using the PDF of FIG. 1.

FIG. 7 shows one interface presentation 702 that may be generated by the interface module 114. In this example, the user initiates the processing performed by the program creation system 104 by explicitly invoking a search function. This action prompts the interface module 114 to present a search box 704 or other input field for receiving the keyword information. Next, assume that the user enters the keyword information, "Take a photo draw text pink" into the search box 704. In inputting this keyword information, the user intends to identify one or more program fragments that perform the task of taking a photograph (e.g., using a handheld computing device) and annotating the picture with pink-colored text.

In response to the user's input, the program creation system 104 generates a set of ranked program fragments. Further assume that the program creation system 104 generates ranking scores for the respective program fragments, and that none of the scores is above a prescribed environment-specific threshold. This result means that none of the ranked program fragments has a particularly high level of confidence associated with it.

In response, the output formulation module 118 can present a list 706 which identifies the ranked program fragments in order of most likely (at the top of the list) to least likely (at the bottom of the list), the most likely having the highest ranking score and the least likely having the lowest ranking score. More specifically, each entry in the list may correspond to any type of information which identifies the corresponding ranked program fragment. For example, an entry may provide a high-level summary of the ranked program fragment, and may optionally provide a link that the user can activate to retrieve additional information regarding the ranked program fragment.

Assume that the user selects a particular ranked program fragment from the list 706. In response, the program creation system 104 can add the code associated with the selected program fragment to the program being created. Alternatively, if the user is not satisfied with any of the ranked program fragments, he or she may decide to reformulate the keyword information in the search box 704.

The output formulation module 118 may also annotate each entry in the list with information that notifies the user of any keyword that did not play a role in generating the corresponding program fragment. For example, the output formulation module 118 displays the message "ignoring 'pink'" 708 to inform the user that the keyword "pink" did not play a role in generating the first program fragment. More specifically, this message may indicate that the program creation system 104 was unsuccessful in interpreting the string "pink." This message may assist the user in determining how to reformulate his or her keyword information, e.g., by subsequently using the word "red" in place of the word "pink."

Alternatively, assume that the top-ranked program fragment has a ranking score that equals or exceeds the prescribed threshold value. In response, the output formulation module 118 can skip the presentation of the list 706 shown in FIG. 7. In its place, the output formulation module 118 can immediately display the code associated with the top-ranked program fragment, by itself or in the context of the overall program in which it is inserted.

More generally stated, the output formulation module 118 can provide its results using different output modes, depending on a level of confidence associated with those results. The output modes involve different levels of interactivity with the user. That is, an output mode for high confidence results demands less interaction with the user compared to an output mode for lower confidence results.

Figure 8:
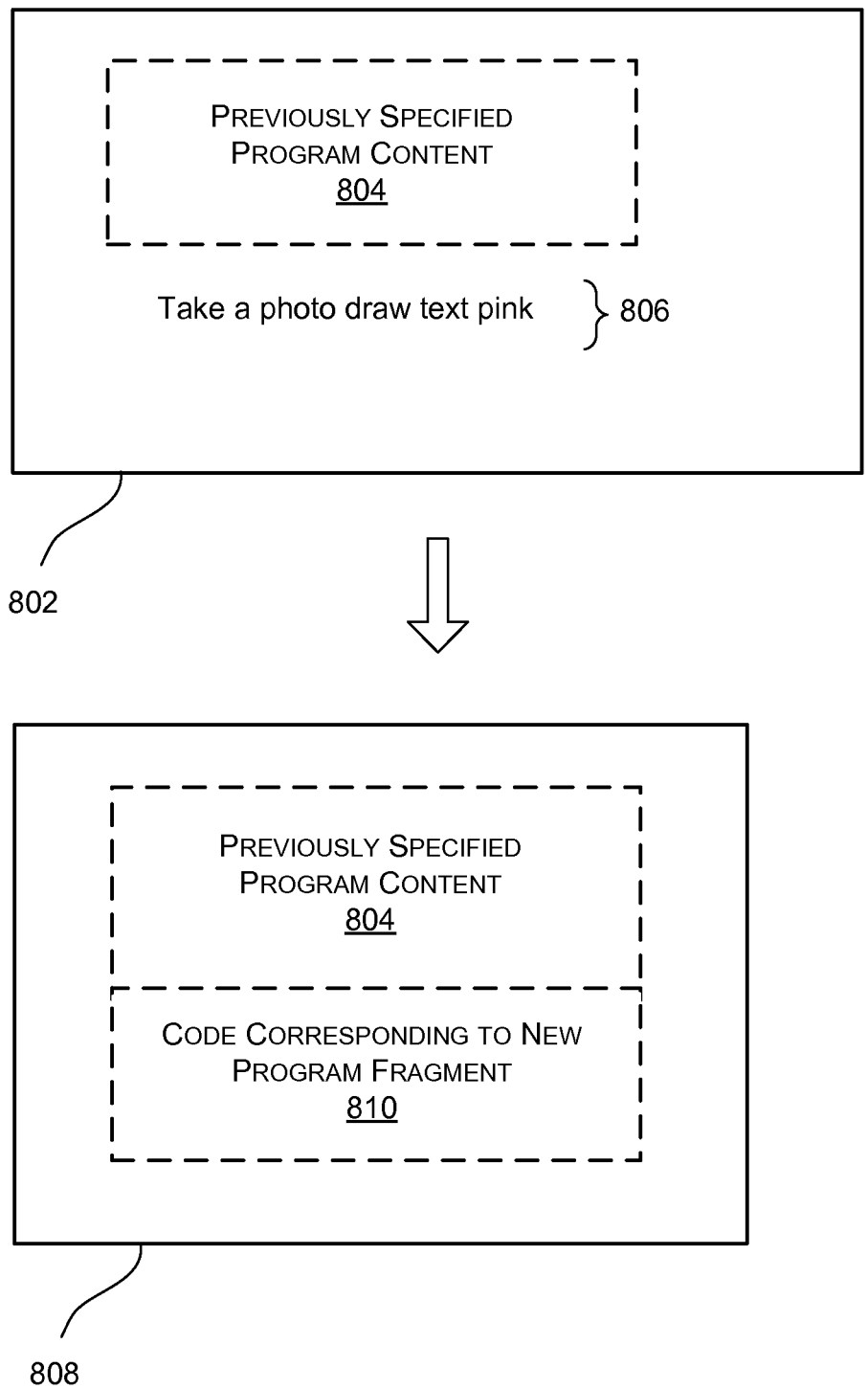
FIG. 8 shows another user interface presentation that may be produced using the PDF of FIG. 1.

Advancing to FIG. 8, in this example, the interface module 114 provides an interface presentation 802 that allows a user to enter keyword information in inline fashion as the user performs an editing action, without explicitly invoking a separate search function. That is, the interface presentation 802 shows previously-specified program content 804. The user types new keyword information at an insertion location at which he or she wishes to add a new program fragment. In this case, the user types the keyword information "Take a photo draw text pink" on a line 806 beneath the program content 804.

The program creation system 104 responds to the user in the same manner described above. That is, in a first case, the program creation system 104 may display the type of list 706 shown in FIG. 7. In a second case, the program creation system 104 may automatically insert the program code associated with a program fragment at the desired insertion location, providing that the confidence level associated with the program fragment is suitably high. The interface presentation 808 shows the outcome of this latter operation;

here, the new code 810 is appended to the end of the previously specified program content 804.

In another interface mode (not shown), the program creation system 104 can function in the manner of a spelling correction application. Here, the program creation system 104 can treat the text that the user inputs while writing a program as input keyword information. The program creation system 104 can generate program fragments that correspond to the keyword information. The program creation system 104 can then alert the user when the text that the user has typed is not a valid program fragment. The program creation system 104 can also give the user the option of replacing the text that he or she has typed with one of the generated program fragments.

In another interface mode, the program creation system 104 can function in the manner of an auto-completion application. Here, the program creation system 104 can again treat the text that the user inputs while writing a program as keyword information. The program creation system 104 can then generate program fragments that correspond to the keyword information. The program creation system 104 can then use a top-ranked program fragment to supply the remainder of the program fragment that the user is assumed to be typing. The program creation system 104 can take this course of action whenever it has a suitably high level of confidence for the top-ranked fragment. The user can activate an undo command to remove the results of the auto-completion operation, if the results are not desired.

The interface module 114 can use yet further modes for interacting with the user. The above examples are cited by way of illustration, not limitation.

B. Illustrative Processes

FIGS. 9-12 show procedures that explain the PDF 102 of FIG. 1 in flowchart form. Since the principles underlying the operation of the PDF 102 have already been described in Section A, certain operations will be addressed in summary fashion in this section.

Figure 9:
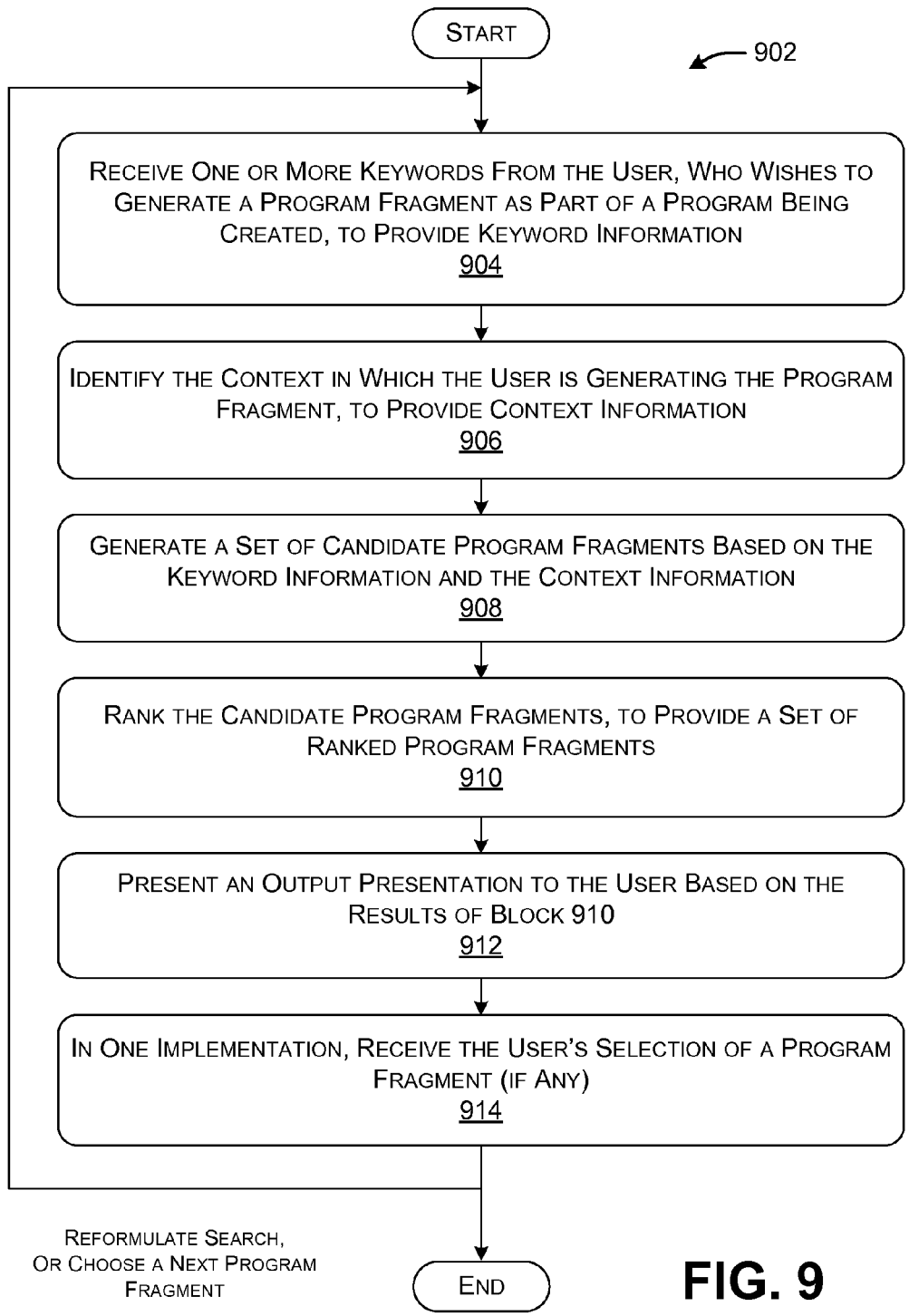
FIG. 9 is a flowchart that provides an overview of one manner of operation of the PDF of FIG. 1.

Starting with FIG. 9, this figure shows a procedure 902 that provides an overview of one manner of operation of the PDF 102. In block 904, the PDF 102 receives, via the interface module 114, one or more keywords from a user who wishes to generate a program fragment as part of a program being created, to thereby provide keyword information. In block 906, the PDF 102 identifies a context in which the user is generating the program fragment, to provide context information. In block 908, the PDF 102 generates a set of candidate program fragments based on the keyword information and the context information. In block 910, the PDF 102 ranks the candidate program fragments based on ranking information, to provide a set of ranked program fragments. In block 912, the PDF 102 presents an output presentation to the user based on the results of block 910. In block 914, in one implementation, the PDF 102 receives a selection from the user of one of the ranked program fragments, provided that the user makes such a selection. Alternatively, the user may forego a selection and reformulate his or her keyword information. The procedure 902 is repeated until the user generates the entire program.

Figure 10:
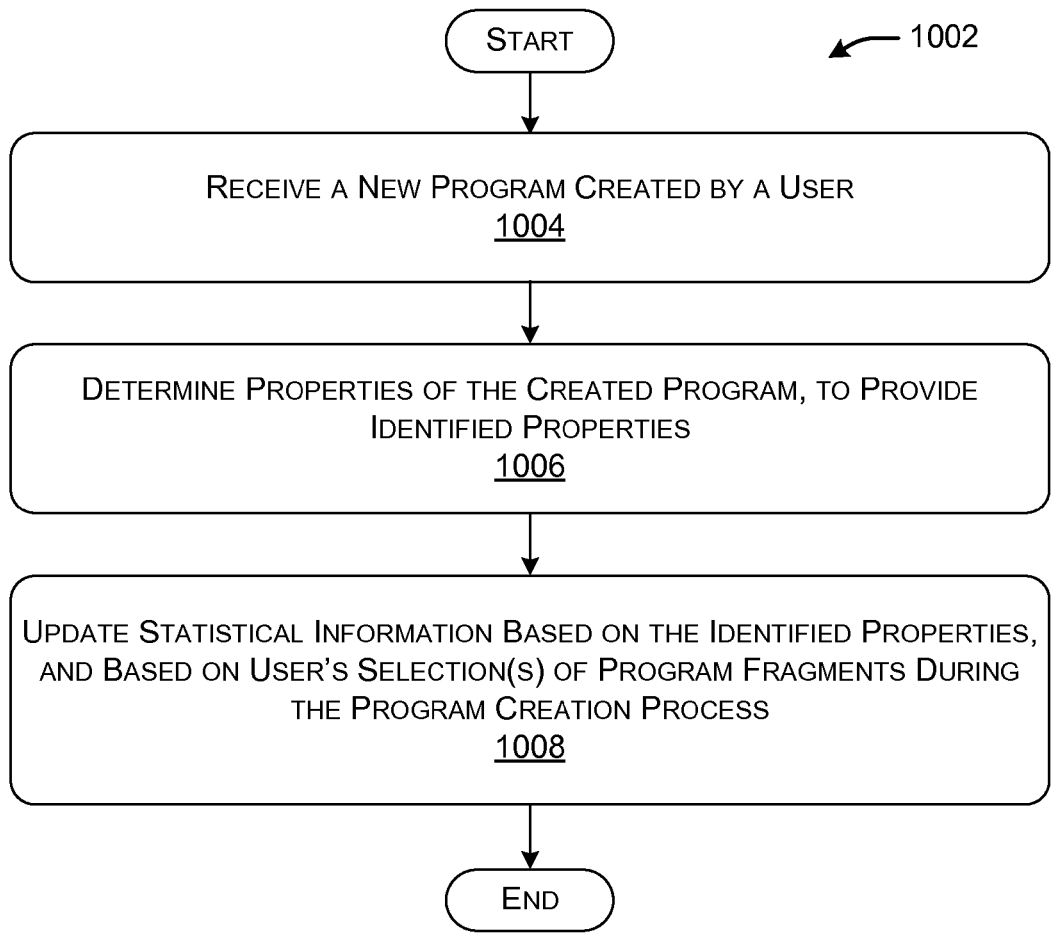
FIG. 10 is a flowchart that describes one manner of operation of a previous program analysis module (PPAM), which is a component of the PDF of FIG. 1.

FIG. 10 shows a procedure 1002 which explains one way in which the previous program analysis module (PPAM) 106 can generate statistical information. In block 1004, the PPAM 106 receives a new program created by a user. In block 1006, the PPAM 106 determines properties of the new program, to provide identified properties. For example, the PPAM 106 can identify the occurrence of program elements in the new program and relationships among the program elements in the new program. In block 1008, the PPAM 106 can update the statistical information based on the properties identified in block 1006. In those cases in which the program was created in the manner described by FIG. 9 (e.g., by successively selecting program fragments), the PPAM 106 can also update the statistical information to reflect the selections made by the user, as qualified by the keyword information entered by the user. The PPAM 106 can perform blocks 1006 and 1008 in an offline manner or in a dynamic on-demand manner, as described in Section A.3.

Figure 11:
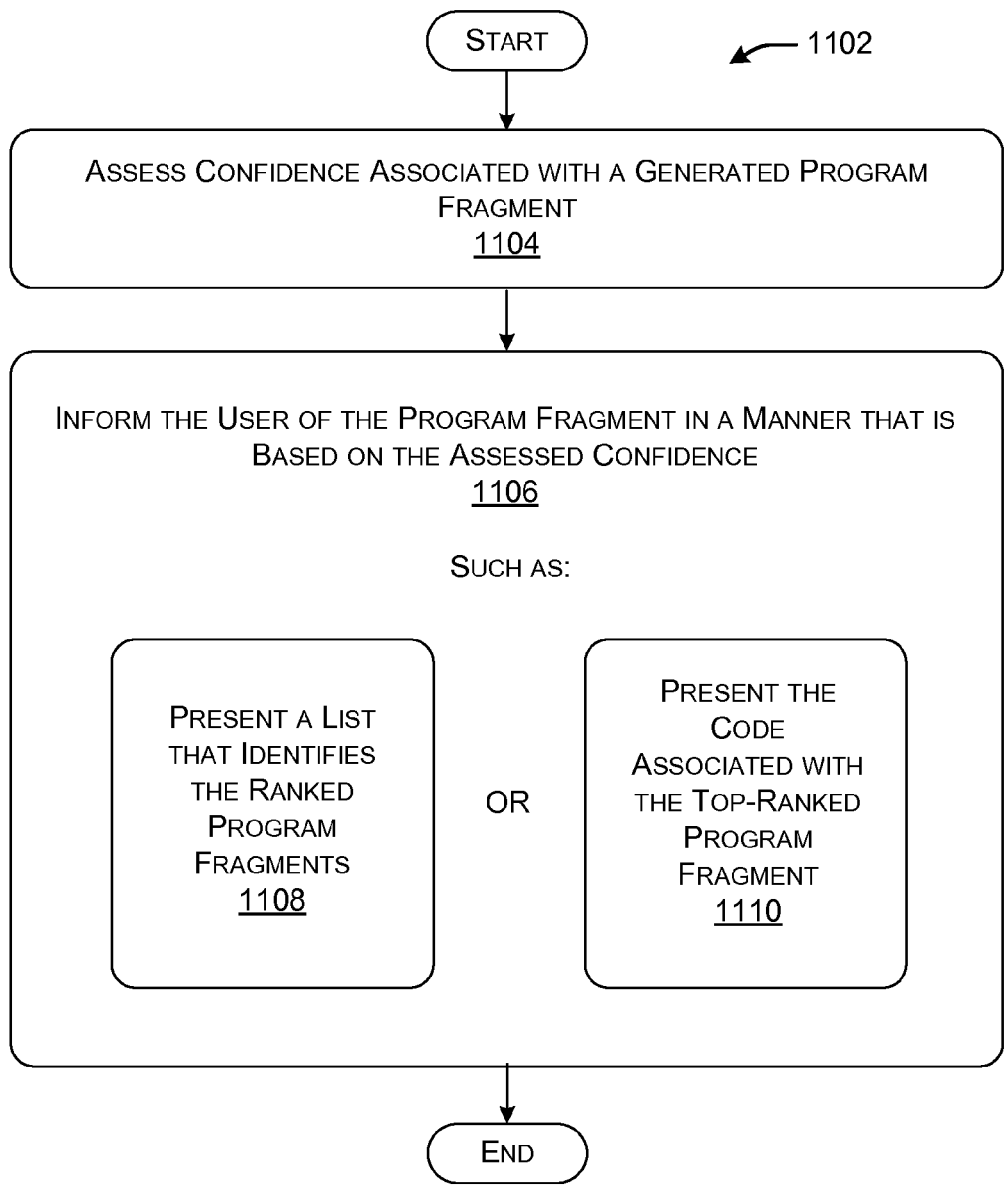
FIG. 11 is a flowchart that describes one manner by which the PDF (of FIG. 1) can present different output presentations, depending on a degree of confidence that is associated with its results.

FIG. 11 shows a procedure 1102 which explains one manner of operation of the output formulation module 118. In block 1104, the output formulation module 118 assesses a level of confidence associated with a ranked program fragment. The output formulation module 118 can perform this task by comparing the ranking score associated with the ranked program fragment with a prescribed threshold value. In block 1106, the output formulation module 118 can inform the user of the ranked program fragment in a manner that is based on the assessed confidence level. For example, in block 1108, the output formulation module 118 can present the ranked program fragment as an entry in a list, as in the example of FIG. 7. This option is appropriate when the ranked program fragment has a confidence level below the prescribed threshold value. Alternatively, in block 1110, the output formulation module 118 can directly present the code associated with the ranked program fragment, foregoing the presentation of the list shown in FIG. 7. This option is appropriate when the ranked program fragment has a confidence level equal to or above the prescribed threshold value.

C. Representative Computing functionality

FIG. 12 sets forth illustrative computing functionality 1200 that can be used to implement any aspect of the functions described above. For example, the computing functionality 1200 can be used to implement any aspect of the PDF 102, including the program creation system 104 and/or the PPAM 106. In one case, the computing functionality 1200 may correspond to one or more computing devices of any type(s). In all cases, the computing functionality 1200 represents one or more physical and tangible processing mechanisms.

The computing functionality 1200 can include volatile and non-volatile memory, such as RAM 1202 and ROM 1204, as well as one or more processing devices 1206 (e.g., one or more CPUs, and/or one or more GPUs, etc.). The computing functionality 1200 also optionally includes various storage devices 1208, such as a hard disk module, an optical disk module, and so forth. The computing functionality 1200 can perform various operations identified above when the processing device(s) 1206 executes instructions that are maintained by memory (e.g., RAM 1202, ROM 1204, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. Further, any computer readable medium may correspond to a fixed component of the computer functionality 1200 or readily detachable component. In many cases, the computer readable medium 1210 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1200 also includes an input/output module 1212 for receiving various inputs (via input devices 1214), and for providing various outputs (via output devices). Illustrative input devices include a keyboard device, a mouse input device, a touchscreen input device, a gesture input device, a voice recognition mechanism, a tabletop or wall-projection input mechanism, and so on. One particular output mechanism may include a presentation device 1216 and an associated graphical user interface (GUI) 1218. The computing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1200 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by one or more computing devices, the method comprising:
    receiving one or more keywords from a user for generating a program fragment as part of a program being created, to thereby provide keyword information;
    identifying a context in which the user is generating the program fragment, to thereby provide context information;
    generating a set of candidate program fragments based on at least the keyword information and the context information;
    ranking the candidate program fragments to provide a set of ranked program fragments, the ranking being based at least on a prevalence of data flow in previously-created programs that include program elements appearing in the candidate program fragments, the data flow being from outputs of individual program elements in the previously-created programs that are used as inputs by other program elements in the previously-created programs; and
    presenting an output presentation to the user identifying at least some of the set of ranked program fragments.

2. The method of claim 1, wherein said receiving comprises receiving said one or more keywords in response to the user invoking a search function.

3. The method of claim 1, wherein said receiving comprises receiving said one or more keywords in response to an editing action performed by the user.

4. The method of claim 1, wherein the context information used to generate the set of candidate program fragments identifies a global variable that has previously been defined in the program being created and that affects the program fragment.

5. The method of claim 1, wherein the context information used to generate the set of candidate program fragments identifies a local variable that has previously been defined in the program being created and that affects the program fragment.

6. The method of claim 1, wherein the context information used to generate the set of candidate program fragments identifies a function that has previously been defined in the program being created and that affects the program fragment.

7. The method of claim 1, wherein the ranking is performed based at least in part on statistical information that includes:
    first statistical information that corresponds to first previously-created programs created by a user who is creating the program; and
    second statistical information that corresponds to second previously-created programs created by one or more other users.

8. The method of claim 7, wherein the statistical information includes frequency information, the frequency information identifying, for at least one program element, a frequency at which said at least one program element appears within a corpus of previously-created programs.

9. The method of claim 7, wherein the statistical information includes selection information, the selection information identifying, for at least one program element, a prevalence at which users have selected said at least one program element in response to submitting the keyword information.

10. The method of claim 1, wherein said presenting comprises providing, for a particular ranked program fragment, an indication of at least one keyword that was not used to generate the particular ranked program fragment.

11. The method of claim 1, wherein said presenting comprises:
    presenting a first output presentation that informs the user about a particular ranked program fragment, for a first level of confidence associated with the particular ranked program fragment; and
    presenting a second output presentation that informs the user about the particular ranked program fragment, for a second level of confidence associated with the particular ranked program fragment,
    wherein the second output presentation demands less interaction with the user compared to the first output presentation, and wherein the second level of confidence is greater than the first level of confidence.

12. The method of claim 11,
    wherein the first output presentation lists the set of ranked program fragments, including the particular ranked program fragment, and
    the second output presentation shows code corresponding to the particular ranked program fragment without requesting the user to select the particular ranked program fragment.

13. The method of claim 1, the output presentation comprising a list of ranked program fragments in ranked order based at least on ranking scores determined by the ranking.

14. The method of claim 13, the ranked order including a highest-ranked program fragment shown at the top of the list and at least one lower-ranked program fragment being shown below the highest-ranked program fragment.

15. A system comprising:
- at least one processing device; and
- at least one computer readable storage medium storing computer readable instructions which, when executed by the at least one processing device, cause the at least one processing device to:
- receive one or more keywords from a user who wishes to generate a program fragment as part of a program being created, to thereby provide keyword information;
- identify a context in which the user is generating the program fragment, to thereby provide context information, the context information specifying one or more of:
  - at least one global variable which affects the program fragment, said at least one global variable having been previously defined in the program being created;
  - at least one local variable which affects the program fragment, said at least one local variable having been previously defined in the program being created; or
  - at least one function which affects the program fragment, said at least one function having been previously defined in the program being created;
- generate a set of candidate program fragments based at least on the keyword information and the context information;
- rank the candidate program fragments to provide a set of ranked program fragments, the candidate program fragments being ranked based at least on a prevalence of data flow in previously-created programs that include program elements appearing in the candidate program fragments, the data flow being from outputs of individual program elements in the previously-created programs that are used as inputs by other program elements in the previously-created programs; and
- present an output presentation to the user identifying at least some of the set of ranked program fragments.

16. The system of claim 15, wherein the computer readable instructions, when executed by the at least one processing device, cause the at least one processing device to:
- receive a user selection of a selected program fragment from the output presentation; and
- insert the selected program fragment into the program being created.

17. The system of claim 16, wherein the computer readable instructions, when executed by the at least one processing device, cause the at least one processing device to:
- examine the selected program fragment to identify a missing input parameter; and
- insert the at least one previously-defined local variable into the missing input parameter.

18. A program creation system, implemented using one or more computing devices, the program creation system comprising:
- an interface module configured to receive one or more keywords from a user who wishes to generate a program fragment as part of a program being created, to thereby provide keyword information;
- a context analysis module configured to identify a context in which the user is generating the program fragment, to thereby provide context information;
- a candidate program identification module configured to generate a set of candidate program fragments based on at least the keyword information and the context information; and
- a ranking module configured to rank the candidate program fragments to provide a set of ranked program fragments, the candidate program fragments being ranked based at least on a prevalence of data flow in previously-created programs that include program elements appearing in the candidate program fragments, the data flow being from outputs of individual program elements in the previously-created programs that are used as inputs by other program elements in the previously-created programs,
- the interface module being configured to present an output presentation to the user identifying at least some of the set of ranked program fragments.

19. The program creation system of claim 18, wherein the context information specifies one or more of:
- at least one global variable which affects the program fragment, said at least one global variable having been previously defined in the program being created;
- at least one local variable which affects the program fragment, said at least one local variable having been previously defined in the program being created; or
- at least one function which affects the program fragment, said at least one function having been previously defined in the program being created.

20. The program creation system of claim 18, wherein the interface module is configured to provide, for a particular ranked program fragment, an indication of at least one keyword that was not used to generate the particular ranked program fragment.

* * * * *